(12) United States Patent
Shozaki

(10) Patent No.: US 8,810,834 B2
(45) Date of Patent: Aug. 19, 2014

(54) IMAGE PROCESSING APPARATUS, CHARGING MANAGEMENT SYSTEM, CHARGING MANAGEMENT METHOD, AND RECORDING MEDIUM

(75) Inventor: Toshiya Shozaki, Osaka (JP)

(73) Assignee: Konica Minolta, Inc., Chiyoda-Ku, Tokyo (JP)

(*) Notice: Subject to any disclaimer, the term of this patent is extended or adjusted under 35 U.S.C. 154(b) by 396 days.

(21) Appl. No.: 13/120,111

(22) PCT Filed: Aug. 11, 2009

(86) PCT No.: PCT/JP2009/003848
§ 371 (c)(1),
(2), (4) Date: Mar. 21, 2011

(87) PCT Pub. No.: WO2010/032367
PCT Pub. Date: Mar. 25, 2010

(65) Prior Publication Data
US 2011/0170139 A1    Jul. 14, 2011

(30) Foreign Application Priority Data
Sep. 19, 2008  (JP) .................................. 2008-241035

(51) Int. Cl.
*G06F 3/12*    (2006.01)

(52) U.S. Cl.
USPC ............. 358/1.15; 358/1.14; 705/30; 705/39; 705/14.53; 707/719; 707/720; 709/219

(58) Field of Classification Search
USPC ................. 358/1.15, 1.14; 705/30, 39, 14.53; 707/719, 720; 709/219
See application file for complete search history.

(56) References Cited

U.S. PATENT DOCUMENTS

2008/0123857 A1    5/2008 Okiyama et al.

FOREIGN PATENT DOCUMENTS

| JP | 10-49471 | 2/1998 | | |
|----|----------|--------|---|---|
| JP | 2000-307783 | 11/2000 | | |
| JP | 2002-330253 | 11/2002 | | |
| JP | 2002330253 A | * 11/2002 | ............... | H04N 1/00 |
| JP | 2004-126881 | 4/2004 | | |
| JP | 2004126881 A | * 4/2004 | ............... | G06F 3/12 |
| JP | 2004-145567 | 5/2004 | | |

OTHER PUBLICATIONS

Japanese Notification of Reasons for Refusal mailed Sep. 15, 2009, directed to counterpart Japanese Application No. 2008-241035; 6 pages.

(Continued)

*Primary Examiner* — Jacky X Zheng
(74) *Attorney, Agent, or Firm* — Buchanan Ingersoll & Rooney P.C.

(57) ABSTRACT

An image processing apparatus stores therein a use charging table that shows a charging condition with respect to use of the image processing apparatus and a cooperative job charging table that shows a charging condition with respect to execution of a cooperative job. In the case where a received job is an apparatus job to be executed only by the image processing apparatus, the use charging table is read. Charging processing is performed based on the read charging table, and a remaining amount is calculated. In the case where a received job is a cooperative job to be executed by the image processing apparatus and a service providing apparatus cooperatively with each other, the cooperative job charging table is read, and charging processing is performed with reference to the read cooperative job charging table as necessary.

9 Claims, 15 Drawing Sheets

(56) References Cited

OTHER PUBLICATIONS

International Search Report mailed Sep. 15, 2009, directed to counterpart International Application No. PCT/JP2009/003848; 4 pages.

Extended European Search Report dated Jan. 3, 2014, directed to EP Application No. 09814213.6; 9 pages.

* cited by examiner

FIG. 3

Apparatus use charging table 101

| Job type | Information | | Billing amount (yen) |
|---|---|---|---|
| Copy/Print | Paper size | A4 | 10 |
| | | B4 | 10 |
| | Color | Full color | 20 |
| | | Monochrome | 10 |

FIG. 4

Cooperative job charging table 102

| Job type | Charging condition |
|---|---|
| Pull print job | Apparatus use billing amount : Necessary<br>Additional billing amount:<br>  50% of apparatus use billing amount |
| Scanning distribution job | Apparatus use billing amount : Unnecessary<br>Additional billing amount: Unnecessary |
| Searchable PDF creation job | Apparatus use billing amount : Unnecessary<br>Additional billing amount: 100 yen per job |
| Barcode print copy job | Apparatus use billing amount : Necessary<br>Additional billing amount: 3 yen per sheet |
| . . . | . . . |

FIG. 6

User management table 103 (August 2008)

| ID | Password | Division name | Budget amount (yen) | Cumulative billing amount (yen) | Remaining amount (yen) |
|---|---|---|---|---|---|
| 0011 | aizq11 | First sales division | 50000 | 38500 | 11500 |
| 0012 | bixr12 | | | | |
| 0013 | cixs13 | | | | |
| . | . | | | | |
| . | . | | | | |
| . | . | | | | |
| 0021 | dhzq21 | Second sales division | 70000 | 46300 | 23700 |
| 0022 | ehxr22 | | | | |
| 0023 | fhxs23 | | | | |
| . | . | | | | |
| . | . | | | | |
| . | . | | | | |
| . | . | . | . | . | . |
| . | . | . | . | . | . |
| . | . | . | . | . | . |
| . | . | . | . | . | . |

FIG. 16

Use restriction information table 104

| ID | Restriction function |
|---|---|
| 0011 | No |
| 0012 | Color copy |
| 0013 | Color copy and barcode print |
| . | . |
| . | . |
| . | . |
| 0021 | No |
| 0022 | No |
| 0023 | Color copy |
| . | . |
| . | . |
| . | . |
| . | . |

IMAGE PROCESSING APPARATUS, CHARGING MANAGEMENT SYSTEM, CHARGING MANAGEMENT METHOD, AND RECORDING MEDIUM

REFERENCE TO RELATED APPLICATIONS

This application is a national stage application under 35 USC 371 of International Application No. PCT/JP2009/003848, filed Aug. 11, 2009, which claims the priority of Japanese Application No. 2008-241035, filed Sep. 19, 2008, the contents of which prior applications are incorporated herein by reference.

FIELD OF THE INVENTION

The present invention relates to an image processing apparatus. The present invention particularly relates to an image processing apparatus and a charging management system that are capable of performing accurate charging in the case where the image processing apparatus executes a job cooperatively with an external service providing apparatus, and to a charging management method to be executed by the image processing apparatus and a recording medium having recorded therein a charging management program to be executed by the image processing apparatus.

BACKGROUND OF THE INVENTION

Recently, with respect to an image processing apparatus provided in a company for example, it is often the case that charging is performed based on a use amount of the image processing apparatus for each group or user for the purpose of budget management.

On the other hand, there is diversification of users' demands for services provided by a complex machine (Multi Function Peripheral) (hereinafter, "MFP") having a plurality of functions such as a copy function, a printing function, and a scanning function. This makes it impossible to perform some processing with use of only the MFP. In view of this, there has been proposed an MFP that is structured to provide a service cooperatively with an external server (service providing apparatus) connected to a network.

For example, the Patent Literature 1 discloses an art relating to a service (pull print service) of downloading desired image data from a contents server on the Internet onto an MFP and printing out the downloaded image data on a recording sheet.

Patent Literature 1: Japanese Patent Application Publication No. 2004-126881
Patent Literature 2: Japanese Patent Application Publication No. 2004-145567

SUMMARY OF THE INVENTION

However, in the case where an MFP provides a service with a user cooperatively with an external server as described above, a billing amount charged for use of the external server often differs for each service. Also, in the case where processing performed by the MFP and processing performed by the external server are intricately intertwined with each other, the charging form becomes complicated. This makes it difficult for the user of the service or a manager of the MFP to know an accurate billing amount. Accordingly, duplicate charging for the same processing might be performed or necessary charging might not be performed in some cases. As a result, it is impossible to perform precise charging management. This is inconvenient.

The present invention is made in view of the above circumstances, and aims to provide an image processing apparatus, a charging management system, a charging management method, and a recording medium having recorded therein a charging management program that are capable of performing appropriate charging management even in the case where a job needs to be executed with use of an external service providing apparatus.

In order to achieve the above aim, an image processing apparatus relating to one aspect of the present invention is an image processing apparatus that is capable of executing a cooperative job that is to be executed cooperatively with a service providing apparatus connected thereto via a network, the image processing apparatus comprising: a job receiver operable to receive a job; a judgment part operable to judge whether the received job is an apparatus job or the cooperative job, the apparatus job being to be executed only by the image processing apparatus; a charging information storage operable to store therein a piece of first charging information showing a charging condition for use of the image processing apparatus and a piece of second charging information showing a charging condition for execution of the cooperative job; a job execution part operable to, based on the judgment performed by the judgment part, execute the apparatus job or part of the cooperative job; a first charging part operable to charge for execution of the apparatus job by referring to the piece of first charging information; and a second charging part operable to charge for execution of the cooperative job by referring to the piece of second charging information.

As described above, a piece of first charging information showing a charging condition for use of the image processing apparatus and a piece of second charging information showing a charging condition for execution of the cooperative job are stored. If a job to be executed is the apparatus job, charging for execution of the apparatus job is performed by referring to the piece of first charging information. If a job to be executed is the cooperative job, charging for execution of the cooperative job is performed by referring to the piece of second charging information. Accordingly, if a job to be executed is the cooperative job, it is possible to appropriately perform charging in the same way as a case where a normal job is executed only by the image processing apparatus.

BRIEF DESCRIPTION OF THE DRAWINGS

FIG. 3 shows a use charging table;

FIG. 4 shows a cooperative job charging table;

FIG. 6 shows a user management table;

FIG. 16 shows a use restriction information table stored in a use restriction information storage unit of the charging management server;

DETAILED DESCRIPTION OF THE INVENTION

The following describes embodiments of an image processing apparatus relating to the present embodiment, using an example where the image processing apparatus is an MFP connectable to a network.

(1) Structure of Image Processing System

Firstly, the following describes the whole structure of an image processing system that includes an MFP relating to a first embodiment.

Figure 1:
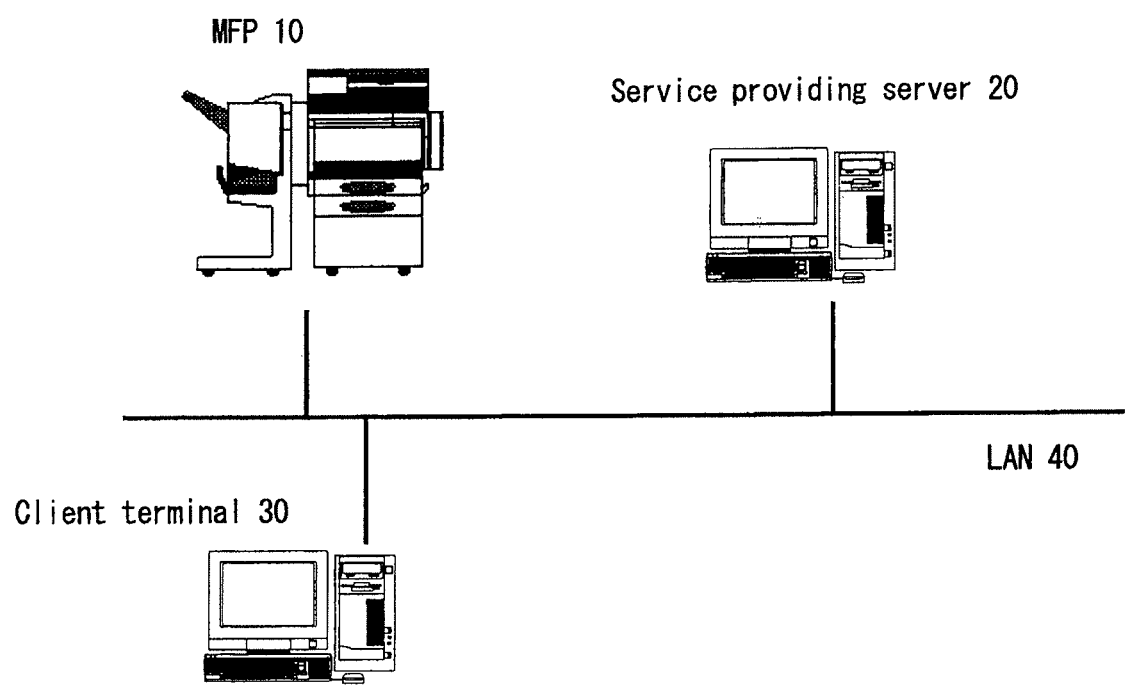
FIG. 1 shows the structure of an image processing system including an MFP relating to a first embodiment of the present invention.

FIG. 1 shows an example of the structure of the image processing system.

As shown in FIG. 1, the image processing system includes an MFP 10, a service providing server 20, and a client terminal 30 that are each connected to a LAN (Local Area Network) 40.

The MFP 10, the service providing server 20, and the client terminal 30 can transmit/receive data among one another via a known network communication program. The MFP 10 performs jobs such as a copy job and a print job in accordance with a user's instruction, and executes various jobs cooperatively with the service providing server 20. In addition, the MFP 10 charges a billing amount based on a charging table that has been set beforehand for execution of a job.

(2) Structure of MFP 10

Figure 2:
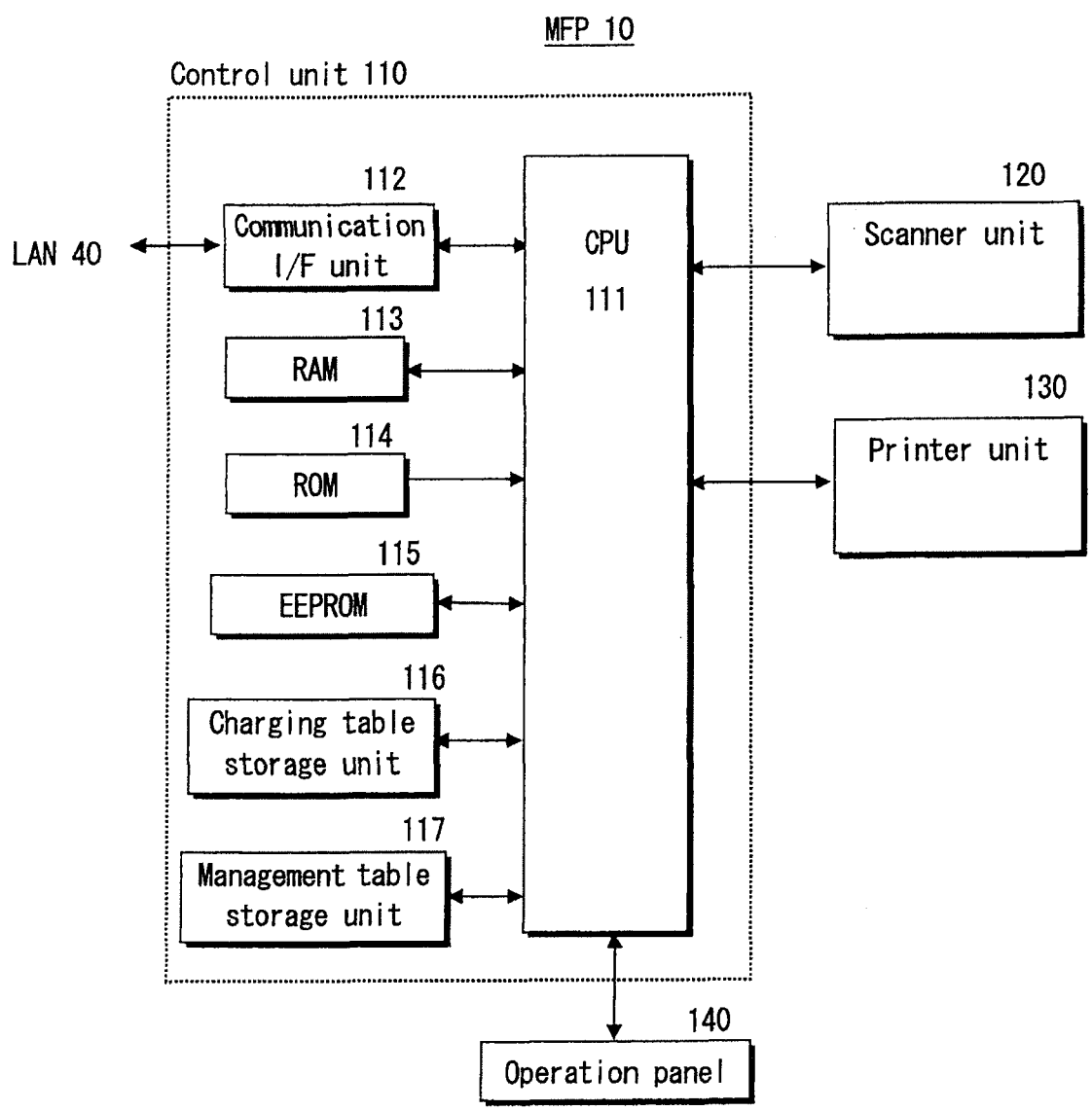
FIG. 2 is a block diagram showing the structure of the MFP included in the image processing system.

FIG. 2 is a block diagram showing the structure of the MFP 10.

As shown in FIG. 2, the MFP 10 mainly includes a control unit 110, a scanner unit 120, and a printer unit 130.

The scanner unit 120 is a known scanner, and includes an automatic document feeder in the present embodiment. The scanner unit 120 conveys documents placed on a document tray to a document scanning position piece by piece, and scans an image of the document by a CCD sensor or the like to generate image data.

The printer unit 130 generates an image on a recording sheet based on the image data generated by the scanner unit 120 or image data relating to a print job received from the client terminal 30. Although a known digital color printer employing an electrophotographic system is used here, the printer unit 130 is of course not limited to this.

The operation panel 140 is provided in a position where the user who is in front of the MFP 10 can easily operate. The operation panel 140 includes hard keys such as a numerical keypad, a start key, and a reset key, and a display unit composed of a liquid crystal panel.

The display unit displays a message necessary for the user, and includes touch panels layered on a surface of a screen thereof. The user can input various instructions in the display unit by touching a predetermined part of the screen being displayed (hereinafter, expressed as "press" in the same way as the hard keys).

The control unit 110 includes a CPU 111, a communication I/F (interface) unit 112, a RAM 113, a ROM 114, an EEPROM 115, a charging table storage unit 116, and a management table storage unit 117.

The CPU 111 performs processing of generating digital image signals of reproduction colors of C, M, Y, and K based on acquired image data. In addition, the CPU 111 reads a necessary program from the ROM 114, and collectively controls operations of the compositional units with precise timing such that operations such as a document scanning operation and an image formation operation are smoothly executed. Also, the CPU 111 performs charging control, which is described later.

The communication I/F unit 112 is a LAN card or a LAN board for connecting the CPU 111 with the LAN. The communication I/F unit 112 receives data relating to a print job transmitted from the client terminal 30 via the LAN, and transmits the received data to the CPU 111 via the LAN.

The RAM 113 is a nonvolatile memory, and functions as a work area of the CPU 111 for program execution.

The ROM 114 stores therein programs for controlling the operations of the compositional units included in the MFP 10, programs for performing the later-described charging control, and so on.

The EEPROM 115 is a nonvolatile memory, and stores therein data such as type of recording sheets stacked in paper cassettes.

The charging table storage unit 116 stores therein an apparatus use charging table 101 as shown in FIG. 3 and a cooperative job charging table 102 as shown in FIG. 4.

In the apparatus use charging table 101, a billing amount is described that is to be charged for each paper size and each of full-color and monochrome. For example, full-color print in A4 size charges 10 yen+20 yen=30 yen per piece.

The cooperative job charging table 102 is a table showing a charging condition for a job to be executed cooperatively with the service providing server 20 connected with the MFP 10 via the LAN 40. In the present embodiment, four cooperative jobs are registered in the cooperative job charging table 102. The following gives simple descriptions of the cooperative jobs.

(a) Pull Print Job

In the pull print job, a user's selected one among files stored in the service providing server 20 is downloaded onto the MFP 10, and the downloaded file is printed out. In this case, a billing amount is charged to the user for use of the MFP 10 for printing (see FIG. 3). In addition, a billing amount of 50% of the billing amount for the use of the MFP 10 is charged to the user for the downloading of the file from the service providing server 20.

(b) Scanning Distribution Job

In the scanning distribution job, image data of a document scanned by the scanner unit 120 of the MFP 10 is transferred to the service providing server 20, and the transferred image data is transmitted to a destination designated by the service providing server 20.

In this case, the MFP 10 and the service providing server 20 each do not have much heavy workload, and accordingly, no billing amount is charged.

(c) Searchable PDF Creation Job

In the searchable PDF creation job, image data of a document scanned by the scanner unit 120 of the MFP 10 is transferred to the service providing server 20. The transferred image data is converted into PDF data, and character recognition is performed to create text data of the image data. The created text data is attached to the PDF data as transparent text data, and is transmitted to a desired destination.

A character code of an identified text matches in position a character of a PDF corresponding to the character code. Accordingly, it is possible to perform text search as if an image of a character of PDF data were text data.

In this case, since the MFP 10 only scans a document, and accordingly charges no billing amount for use of the MFP 10. On the other hand, the service providing server 20 charges 100 yen for each job execution without exception.

(d) Barcode Printing Copy Job

In the barcode printing copy job, image data of a document scanned by the scanner unit 120 is transmitted to the service providing server 20 together with information relating to the model of the MFP 10. The service providing server 20 converts history information into a barcode, and attaches data of the barcode to the original image data to transmit back to the MFP 10. The history information shows the copy date, the model of the copy machine, and the number of how many copy machines have been used before use of the current copy machine. In the MFP 10, the original image data and the barcode are printed out on the same paper.

The MFP 10 charges a billing amount for print processing based on the charging table shown in FIG. 3. The service providing server 20 charges 3 yen per piece of paper for creation of barcode data.

In the present embodiment as described above, the charging conditions stored in the cooperative job charging table 102 are defined to refer to the apparatus use charging table 101 as necessary. Accordingly, it is possible to reduce a volume of information stored in the cooperative job charging table 102 and reduce the capacity of a memory that is necessary for storing the information. This leads to the cost reduction. Especially, in the case where a charging table is provided for each user in the second embodiment as described later, the number of charging tables increases. This leads to the more effective cost reduction.

Alternatively, it may be possible to define a charging condition stored in the apparatus use charging table 101 corresponding to a cooperative job stored in the cooperative job charging table 102 that is charged for use of the MFP 10, and refer to the apparatus use charging table 101.

The cooperative jobs and the charging condition as described above have been registered beforehand in the cooperative job charging table 102 by a manager of the MFP 10.

Figure 5A:
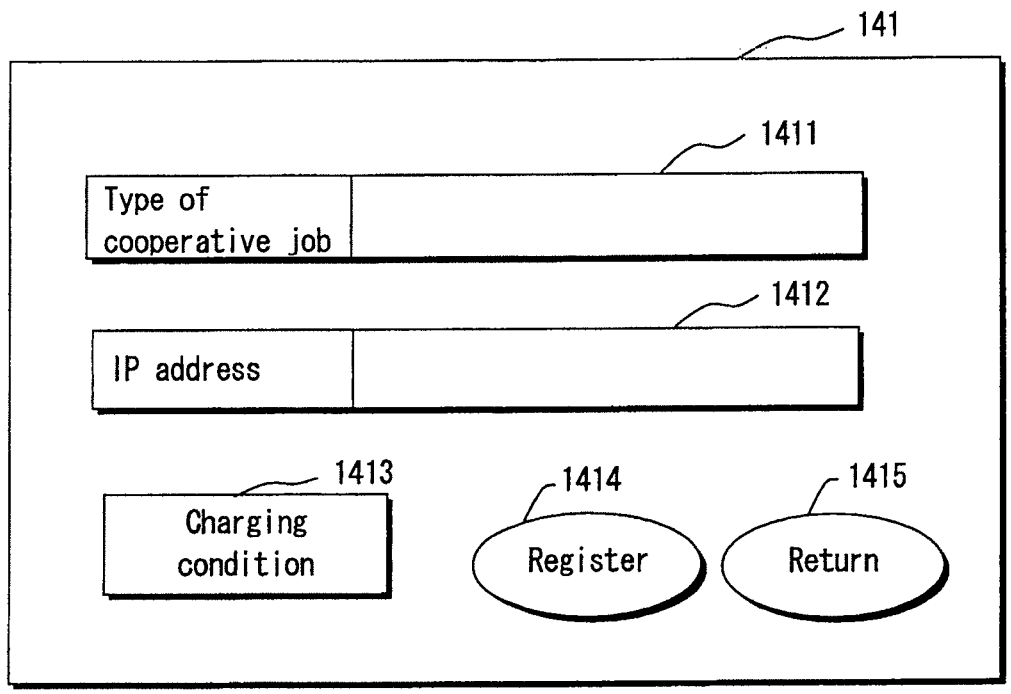
FIG. 5(a) and FIG. 5(b) each show a registration screen for a cooperative job displayed on a display unit of an operation panel of the MFP.
Figure 5B:
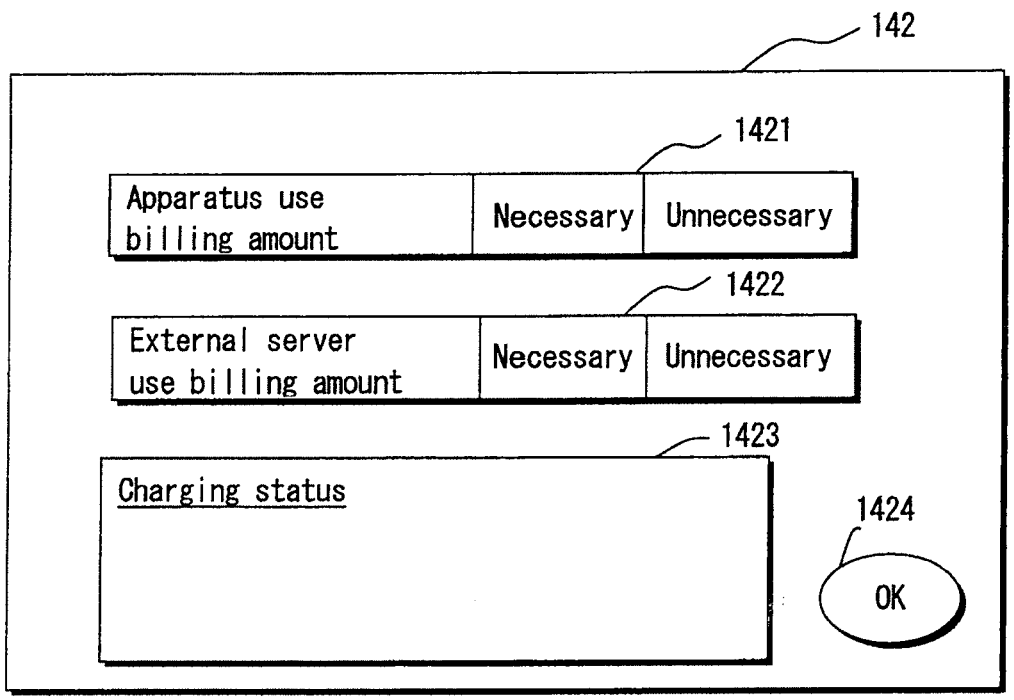

FIG. 5(*a*) and FIG. 5(*b*) each show a registration screen for a cooperative job displayed on the display unit of the operation panel 140 of the MFP 10.

A registration screen 141 shown in FIG. 5(*a*) can be displayed by the manager of the MFP 10 inputting a password for management, for example. The manager inputs a job name of a desired job in a cooperative job entry field 1411.

This input may be performed via keys of a numerical keypad (not shown) that are respectively associated with alphabets, kana characters, or the like. Alternatively, the input may be performed via a virtual keyboard displayed on the display unit. Further alternatively, the input may be performed by the structure in which a recording medium reading apparatus such as an IC card reader is provided in the MFP 10, and the recording medium reading apparatus is caused to read information recorded in a recording medium such as an IC card.

An IP address of the service providing server 20 is input in an IP address entry field 1412.

When a button of a charging condition 1413 is pressed, the screen is switched to a charging condition setup screen 142 as shown in FIG. 5(*b*). The manager operates a use charge setup field 1421 and an external server use charge setup field 1422 to designate whether a billing amount needs to be charged for each of use of the MFP 10 and use of an external server. If "YES" is selected with respect to the billing amount for the use of the external server, a charging entry field 1423 becomes active. The user inputs a predetermined billing amount in the charging entry field 1423, and presses an OK button 1424. Then, the screen switches back to the registration screen 141 shown in FIG. 5(*a*). Here, when the user presses the registration button 1414, the screen returns to a default basic setup screen (not shown).

As a result, a new cooperative job is registered in the cooperative job charging table 102 (FIG. 4) included in the charging table storage unit 116. Note that in order to return to the basic setup screen without registering a cooperative job in the registration screen 141, the user presses a return button 1415.

In the case where there is a necessity to install, in the MFP 10, a specific application for executing a cooperative job to be executed cooperatively with the service providing server 20, it may be possible to cause the MFP 10 to access the service providing server 20 or a specific site on the Internet to download a desired driver.

In the present embodiment, the description is given on the assumption that the MFP 10 and the service providing server 20 are connected with the same LAN 40 and are managed by the same manager. Instead, in the case where the service providing server 20 is on the Internet and is managed by a manager different from a manager of the MFP 10 for example, the charging condition as described above or the like is input based on a contract with the manager of the service providing server 20.

Alternatively, such a cooperative job charging table may be updated or changed by downloading a new cooperative job charging table from a management server (not shown) via the network.

Here, turning to FIG. 2, the management table storage unit 117 stores therein a user management table 103 necessary for performing charging management.

FIG. 6 shows an example of the user management table 103.

In the user management table relating to the present embodiment, monthly budget management is performed. FIG. 6 shows the user management table 103 showing billing amounts charged in August 2008. In the user management table 103, a user ID and a password necessary for login, a division name of a division to each user belongs to, a budget amount allocated to each division, a cumulative billing amount of August 2008 for each division, and a remaining amount of August 2008 for each division calculated by subtracting the cumulative billing amount from the budget amount.

Note that each of the above tables may be stored in an appropriate storage region provided in the EEPROM 115 for example, instead of an exclusive storage unit.

Figure 7:
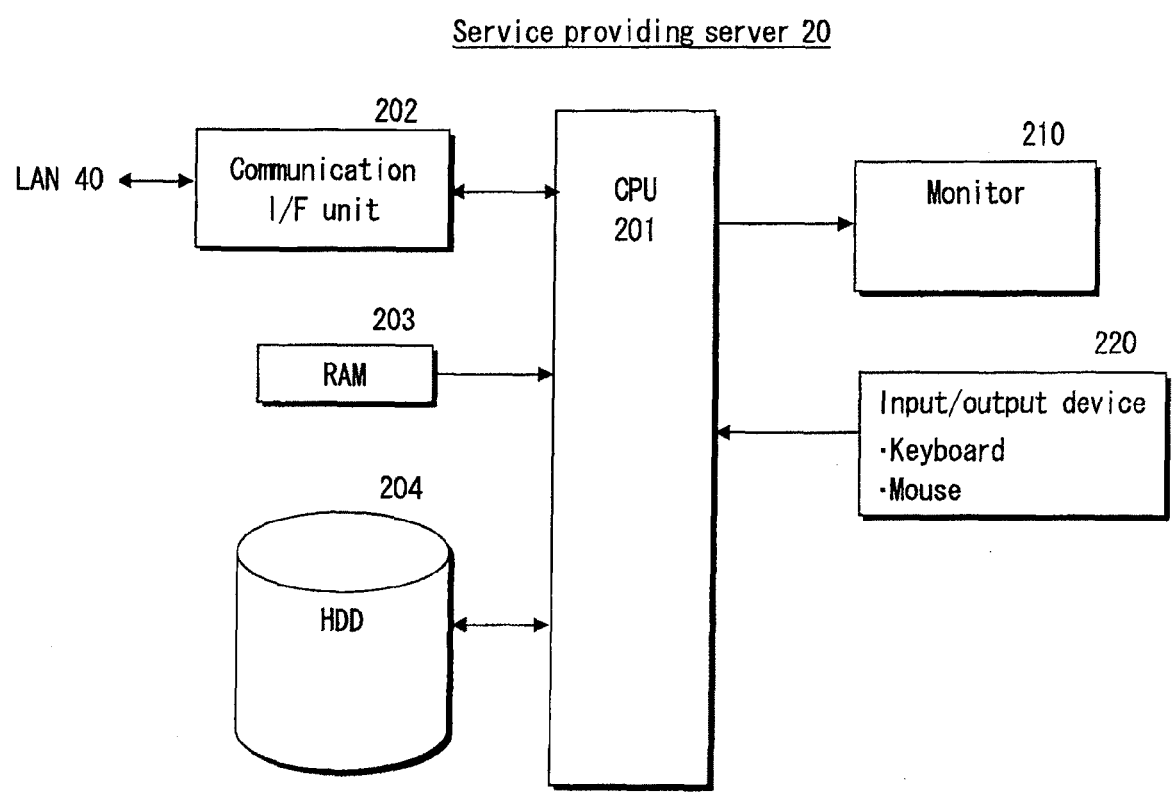
FIG. 7 is a block diagram showing the structure of a service providing server.

FIG. 7 is a block diagram showing the structure of the service providing server 20. The service providing server 20 includes a CPU 201, a communication I/F unit 202, a RAM 203, a hard disk device (HDD) 204, a monitor 210, and an input/output device 220 such as a keyboard and a mouse.

The HDD 204 stores therein an OS functioning as a service providing server, an application program of a job to be executed cooperatively with the MFP 10. Upon receiving a request for execution of a cooperative job from the MFP 10 via the communication I/F 202, the service providing server 20 starts up an application corresponding to the requested cooperative job, and transmits a response indicating completion of preparation of executing the cooperative job to the MFP 10. The MFP 10 transmits image data that is a processing target to the service providing server 20.

The service providing server 20 expands the received image data in the RAM 203, and performs necessary image processing on the expanded image data. Then, the service providing server 20 transmits back the image data on which the processing has been performed to the MFP 10, or converts a file format of the image data as necessary and transfers the image data to a destination designated by the MFP 10.

(3) Charging Control Processing

Figure 8:
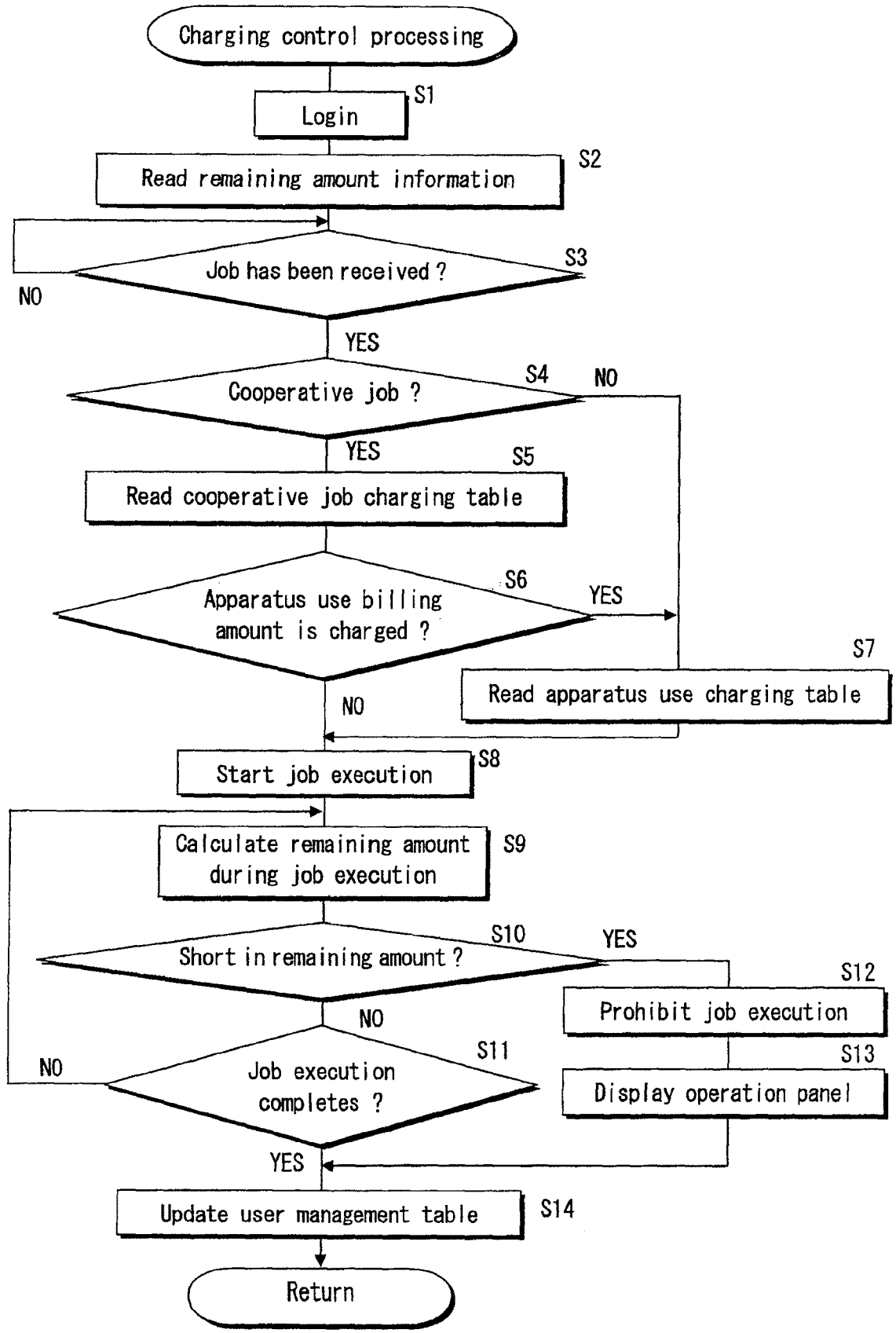
FIG. 8 is a flow chart showing charging control processing performed by a control unit of the MFP.

FIG. 8 is a flow chart showing charging control processing performed by the control unit 110 included in the MFP 10.

Firstly, login processing is performed in Step S1. When the user inputs his user ID and password via the operation panel 140 of the MFP 10, the CPU 111 searches whether the user's ID and password are registered in the user management table 103 stored in the management table storage unit 117. If the user's ID and password are registered, the CPU 111 permits the user to log in the MFP 10 (Step S1).

Then, from the user management table 103, the CPU 111 reads a remaining amount of a division to which the user belongs, and temporarily stores the read remaining amount in the RAM 113 (Step S2).

Next, the CPU 111 judges whether a job has been received (Step S3). If judging that the job has been received (Step S3: YES), the CPU 111 further judges whether the received job is a cooperative job (Step S4).

In the case where the job has been received via the operation panel 140, the type of the received job can be distinguished based on input of the job. In the case where the job has been received from the client terminal 30, the type of the received job can be distinguished based on control information (command) included in header data of the received job. The control information is set by the user performing a predetermined input on a setup screen for a driver for cooperative job that is installed in the client terminal 30.

Here, FIG. 9 to FIG. 13 each show an example of a reception screen for cooperative job that is displayed on the operation panel 140 of the MFP 10.

Figure 9:
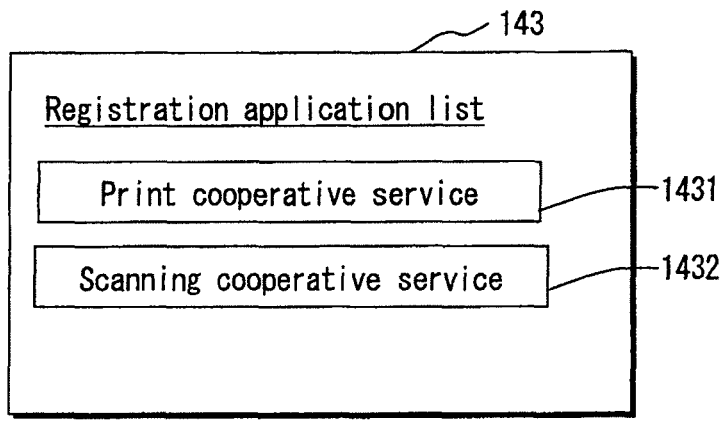
FIG. 9 shows a reception screen for a cooperative job displayed on the display unit of the operation panel.
Figure 10:
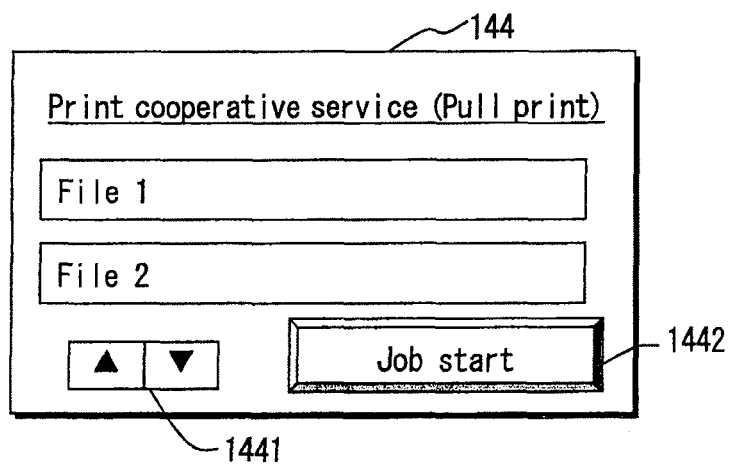
FIG. 10 shows a file selection screen that is displayed on the display unit in the case where a printing cooperative service is selected on the reception screen shown in FIG. 9.

When a tab of cooperative job is pressed on an initial screen (not shown) of the display unit of the operation panel 140, a cooperative job reception screen 143 shown in FIG. 9 is displayed on the display unit of the operation panel 140. Here, when a print cooperative service button 1431 is pressed, a file selection screen 144 shown in FIG. 10 is displayed.

On the file selection screen 144, a list of image files is displayed. The image files are stored in the HDD 204 of the service providing server 20. The user scrolls the file selection screen 144 using a scroll button 1441 to select an image file that the user hopes to print out. Then, the user presses a job start button 1442, and as a result data of the selected image file is downloaded from the service providing server 20 to the MFP 10. Then, the image file is printed out.

Figure 11:
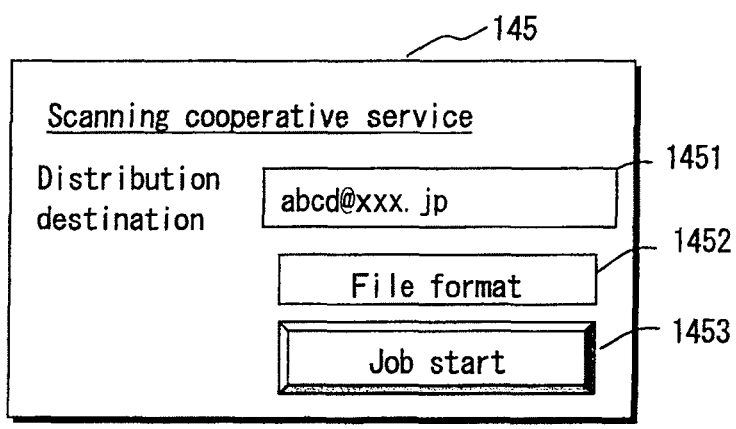
FIG. 11 shows a distribution destination setup screen in the case where a scanning cooperative service is selected on the reception screen shown in FIG. 9.

When a scanning cooperative service button 1432 is selected on the cooperative job reception screen 143 shown in FIG. 9, a distribution destination setup screen 145 as shown in FIG. 11 is displayed.

The user presses a distribution destination entry field 1451 for activation, and inputs a mail address of a destination using the numerical keypad or the like.

Figure 12:
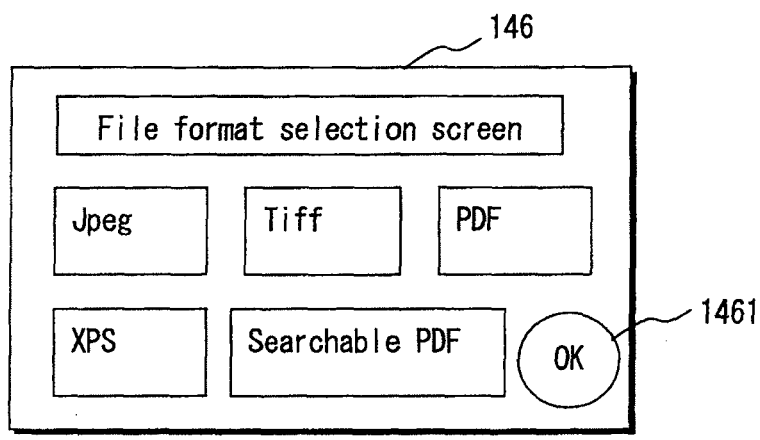
FIG. 12 shows a format selection screen that is displayed on the display unit in the case where a file format button is pressed on the distribution destination setup screen shown in FIG. 11.

When the user presses a file format button 1452, a format selection screen 146 as shown in FIG. 12 is displayed. The user selects a desired format, and presses an OK button 1461.

Then, the user places a document that the user hopes to transmit on the document tray of the automatic document feeder, and presses a start button (not shown) of the operation panel 140. As a result, the document is scanned, and image data of the document is converted into the selected format, and the converted image data is transmitted to the input mail address.

Note that, in the case where "Searchable PDF" is selected on the format selection screen 146 shown in FIG. 12, the searchable PDF creation job as described above is executed.

Figure 13:
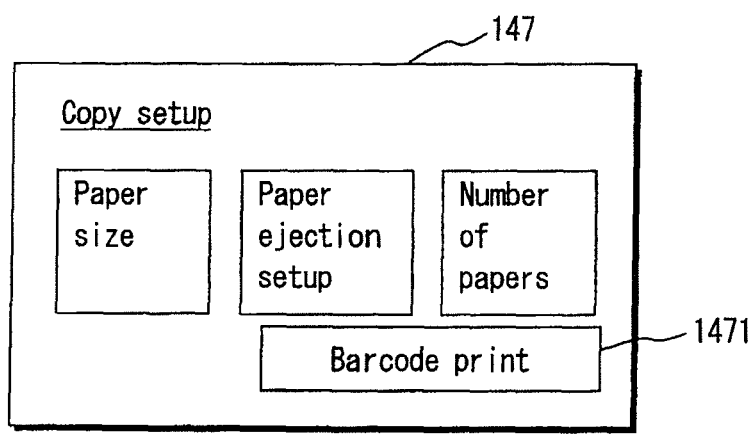
FIG. 13 shows a copy setup screen that is displayed on the display unit in the case where a copy job is selected on the operation panel.

Also, when a hard key (not shown) for copy provided in the operation panel 140 is pressed, a copy setup screen 147 as shown in FIG. 13 is displayed on the display unit. Here, when a barcode printing button 1471 is pressed and then a start button (not shown) of the hard key is pressed, the barcode printing copy job as described above is executed.

Basic software for displaying the setup screen for cooperative job on the operation panel 140 is stored in the EEPROM 115 (FIG. 2), for example. When the manager registers a new cooperative job, the manager accesses the service providing server 20 or a website of a manufacturer of the MFP 10, and downloads new firmware to update the software.

Turning to the flow chart shown in FIG. 8, if judging that the job received in Step S3 is not a cooperative job (Step S4: NO), that is, if judging that the received job is a normal job executable only by the MFP 10, the flow proceeds to Step S7. The control unit 110 refers to the apparatus use charging table 101 (FIG. 3).

On the other hand, if judging that the job received in Step S3 is a cooperative job (Step S4: YES), the control unit 110 reads the cooperative job charging table 102 (FIG. 4), and stores the read cooperative job charging table 102 in the RAM 113. The control unit 110 refers to a charging condition with respect to the cooperative job selected by the user (Step S5). If a charging condition with respect to execution of the cooperative job shows that it is necessary to charge an apparatus use billing amount (Step S6: YES), the control unit 110 further reads the apparatus use charging table 101 (Step S7).

In the case where it is unnecessary to charge an apparatus use billing amount for execution of the cooperative job (Step S6: NO), only the cooperative job charging table 102 is used.

Then, the control unit 110 starts executing the selected job (Step S8). While executing the job, the control unit 110 refers to a charging table that has been read depending on whether the job is a cooperative job to calculate a billing amount, and subtracts the billing amount from the remaining amount acquired in the Step S2 to calculate a new remaining amount (Step S9). If judging continuation of the job will result in shortage of the remaining amount (Step S10: YES), the control unit 110 prohibits execution of the job (Step S12), and displays a message showing the prohibition on the display unit of the operation panel 140 (Step S13). Also, the control unit 110 updates values respectively stored in a cumulative billing amount field and a remaining amount field of a division to which the user belongs in the user management table 103 with a billing amount and a remaining amount at the time of the prohibition of the job (Step S14).

Also, if judging that continuation of the job will not result in shortage of the remaining amount (Step S10: NO), the control unit 110 continues executing the job. When completing execution of the job (Step S11: YES), the control unit 110 updates the values respectively stored in the cumulative billing amount field and the remaining amount field of the division to which the user belongs in the user management table 103 with a billing amount and a remaining amount at the time of the completion of the job (Step S14). Then, the flow returns to a main flow chart (not shown) for controlling the whole operations of the MFP 10.

According to the charging control processing relating to the present embodiment as described above, the apparatus use charging table 101 and the cooperative job charging table 102 are provided in the MFP 10, a charging table that needs to be referred to is selected based on a type of a received job so as to perform charging. This enables the MFP 10 to uniformly perform accurate charging management irrespective of whether the received job is a cooperative job or a normal job.

Also, with such a structure, there is no necessity that each time a cooperative job is executed, an inquiry is made to the service providing server 20 about a charging condition for execution of the cooperative job. Accordingly, this does not lead to the increase in the communication load. Furthermore, since it is unnecessary to change the sequence of the communication of the service system, the conventional system can be used without modification. This is greatly useful.

According to the structure relating to the above first embodiment, the charging management is performed by the MFP 10. According to the structure relating to a second embodiment, a charging management server connected to the MFP 10 via the network is separately provided, and the charging table and charging results are managed by the charging management server.

(1) Structure of Image Processing System

Figure 14:
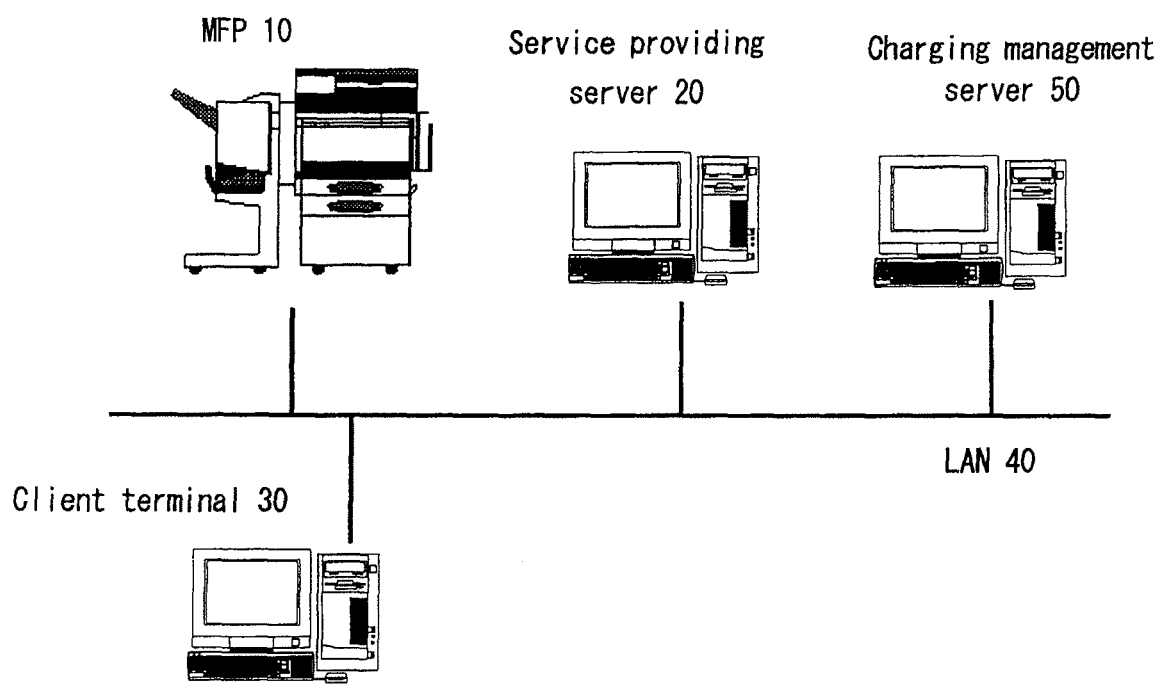
FIG. 14 shows the structure of an image processing system including an MFP relating to a second embodiment of the present invention.

FIG. 14 shows the structure of an image processing system relating to the present embodiment.

As shown in FIG. 14, the difference of the image processing system shown in FIG. 14 from that shown in FIG. 1 is that a charging management server 50 is included and is connected to a LAN 40.

Figure 15:
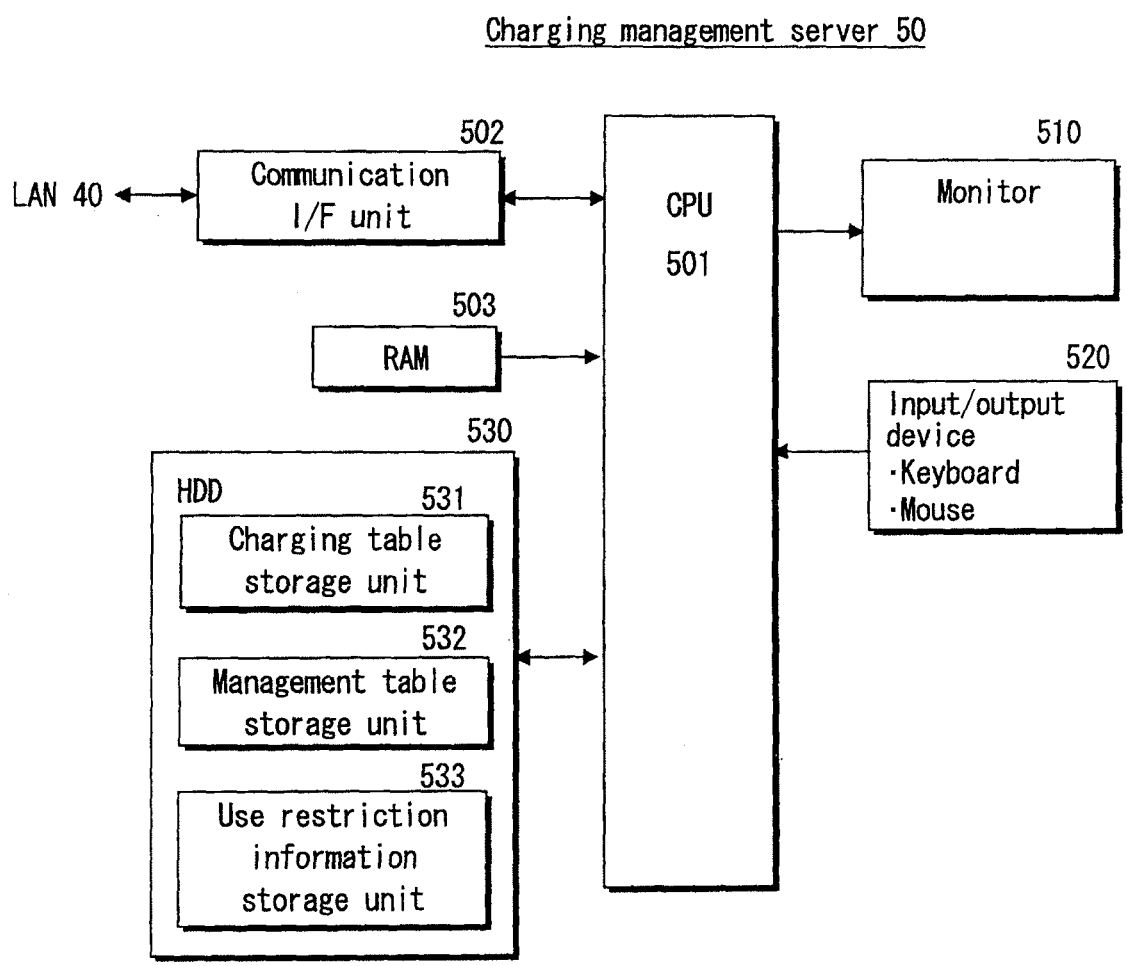
FIG. 15 is a block diagram showing the structure of a charging management server relating to the second embodiment.

FIG. 15 is a block diagram showing the structure of the charging management server 50. The charging management server 50 includes a general purpose computer to which an OS for a server and charging management software have been installed. The general purpose computer includes a CPU 501, a communication I/F unit 502, a RAM 503, a monitor 510, an input/output device 520, and a hard disk storage device (HDD) 530.

The HDD 530 includes therewithin a charging table storage unit 531, a management table storage unit 532, and a use restriction information storage unit 533.

The charging table storage unit 531 stores therein tables provided for each user ID, which are respectively similar to the apparatus use charging table 101 (FIG. 3) and the cooperative job charging table 102 (FIG. 4) stored in the charging table storage unit 116 (FIG. 2) of the MFP 10 relating to the first embodiment. By providing a charging table for each user ID in this way, it is possible to perform charging in accordance with a user's position. For example, in the case where the charging management system is used in a university, different charging processing can be performed on a professor, an associate professor, or the like and students in a laboratory.

Alternatively, the charging table may be provided not for each user but for each group to which the user belongs to. In the example shown in FIG. 6 as described already, it may be possible to provide a charging table different for each division in consideration of the necessity, the use frequency in the division, and the like.

The management table storage unit 532 stores therein a table similar to the user management table 103 shown in FIG. 6.

Also, the use restriction information storage unit 533 stores therein a use restriction information table 104 as shown in FIG. 16 that includes a use restriction function for each user ID. The use restriction information storage unit 533 is used for restricting execution of an executable job for each user ID. In this example, while a user having a user ID 0011 is not restricted with respect to execution of any job, a user having a user ID 0012 is prohibited from executing a color copy job whose billing amount is high. Note that this use restriction information may be set not for each user but for each group to which the user belongs.

On the other hand, the control unit 110 of the MFP 10 relating to the present embodiment does not include the charging table storage unit 116 and the management table storage unit 117.

(2) Charging Control Processing

In the preset embodiment, charging control performed by the MFP 10 is basically the same as that shown in FIG. 8. The charging table and the user management table are included in the charging management server 50. Also, in the preset embodiment, use restriction information is acquired and job execution is prohibited based on the acquired use restriction information. Accordingly, processing of Steps S1 to S3 of FIG. 8 is replaced with processing of Steps S101 to S106 of FIG. 17.

In the flowchart shown in FIG. 17, the control unit 110 performs login processing in Step S101, and acquires balance information, charging table, and use restriction information relating to a user who logs in (hereinafter, these three pieces of information is collectively referred to as "user information") (Step S102).

These processing is performed by communication between the MFP 10 and the charging management server 50.

Figure 18:
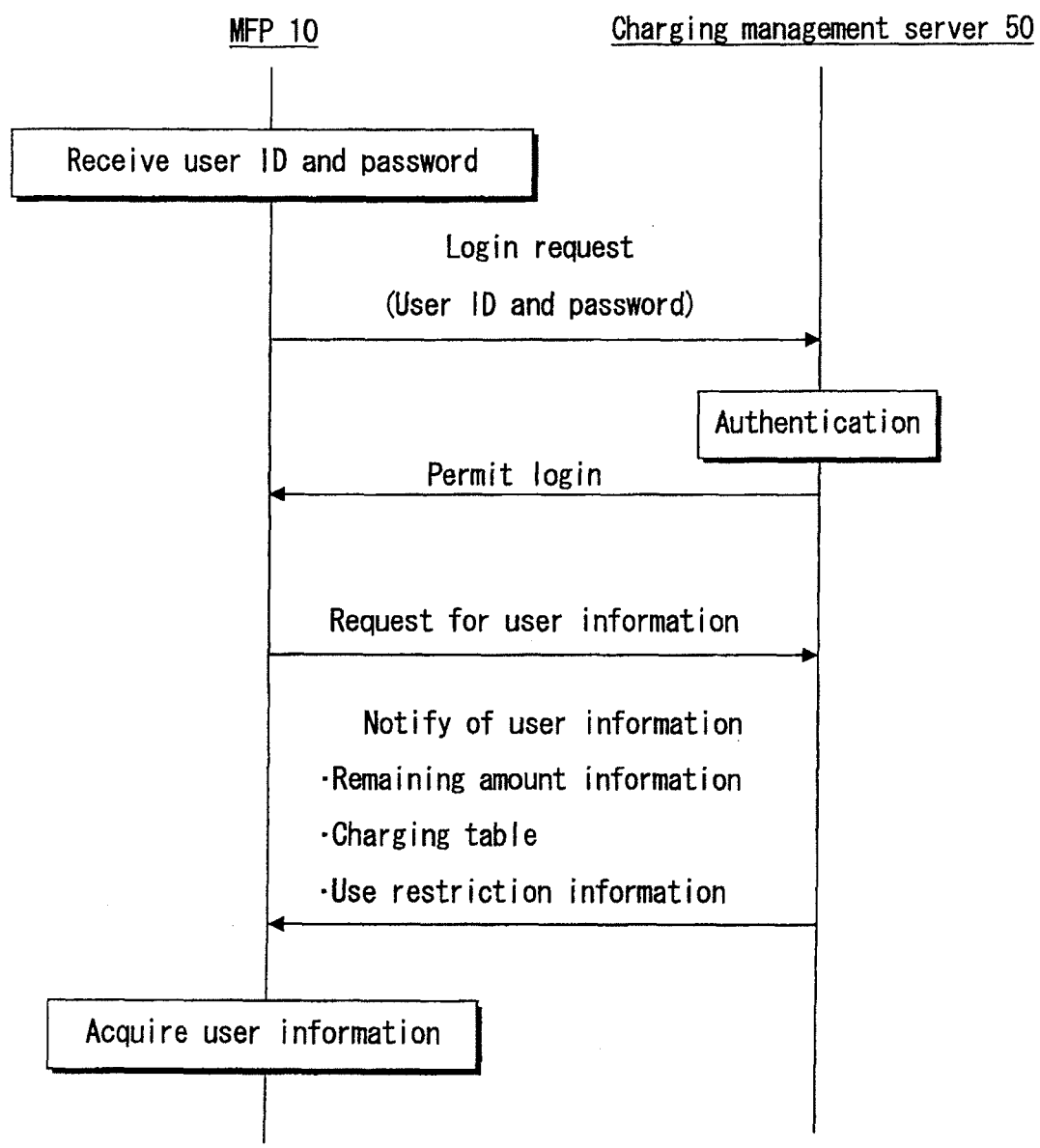
FIG. 18 is a sequence showing communication performed between the MFP and the charging management server in Steps S101 and S102 of the flow chart shown in FIG. 17.

FIG. 18 is a sequence showing communication performed between the MFP 10 and the charging management server 50 in the above processing.

Firstly, upon receiving a user ID and a password from the user via the operation panel 140, the control unit 110 transmits the received ID and password to the charging management server 50 via the LAN 40 to request for permission of login.

The CPU 501 of the charging management server 50 searches the user management table stored in the management table storage unit 532, and confirms that the received ID and password are registered in the user management table. Then, the charging management server 50 authenticates the user, and transmits notification of login permission to the MFP 10.

Upon receiving the notification, the MFP 10 requests the charging management server 50 for user information relating to the user who is logging in. The charging management server 50 reads a charging table, balance information, and use restriction information that each relate to the user ID respectively from the charging table storage unit 531, the management table storage unit 532, and the use restriction information storage unit 533. Then, the charging management server 50 transmits the read charging table, balance information, and use restriction information to the MFP 10 as user information.

Upon receiving the user information, the MFP 10 stores the user information in the RAM 113 of the control unit 110 (acquisition of user information: Step S102 in FIG. 17).

Next, the MFP 10 judges whether a job has been received (Step S103). If judging that the job has been received (Step S103: YES), the MFP 10 refers to the use restriction information table 104 included in the acquired user information to judge whether the user is prohibited from executing the received job (Step S104).

If judging that the user is not prohibited from executing the job received in Step S103 (Step S104: NO), the flow proceeds to Step S4 in FIG. 8. The MFP 10 judges whether the received job is a cooperative job, and performs charging control similar to that shown in Steps S5 to S13.

In the preset embodiment, since the user management table is updated by the charging management server 50, the MFP 10 performs "charging result notification processing" instead of the "user management table update processing" in Step S14 of FIG. 8.

Figure 19:
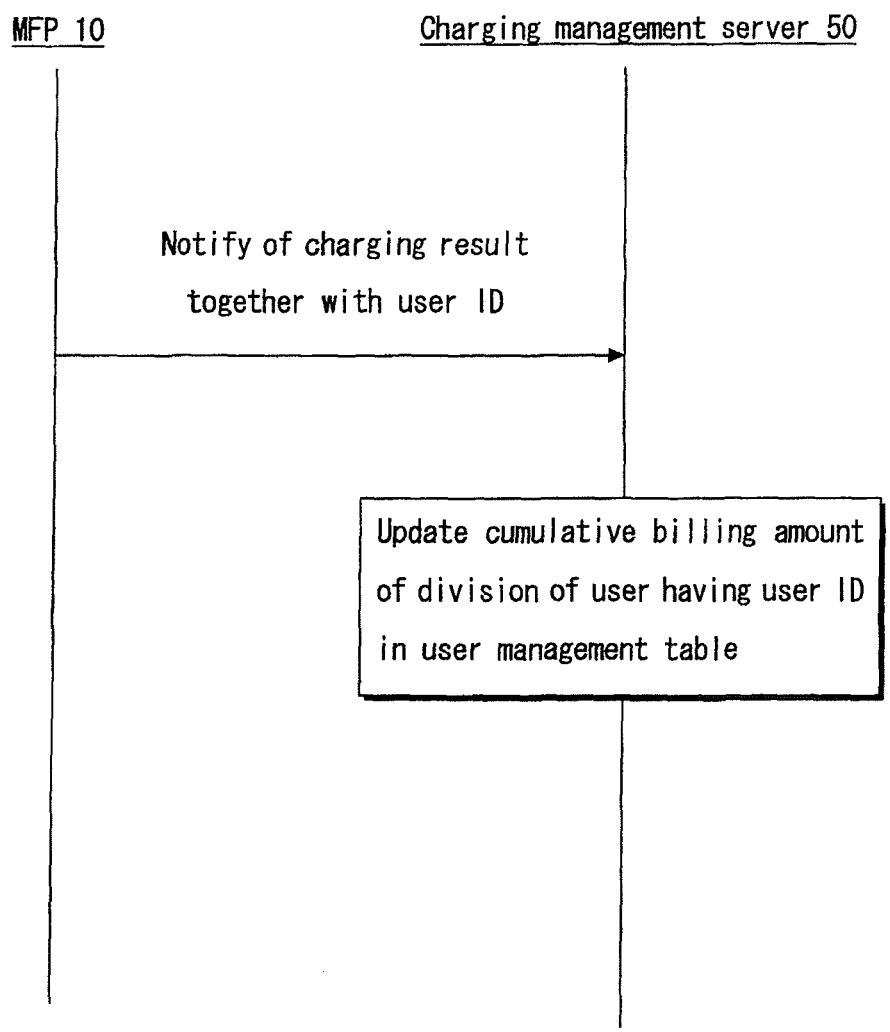
FIG. 19 is a sequence showing communication performed between the MFP and the charging management server relating to the second embodiment in the case where a charge result obtained in charging control processing performed by the MFP is updated.

In other words, as shown in the sequence of communication shown in FIG. 19, the MFP 10 performs processing of notifying the charging management server 50 of a charging result of execution of the job together with a user ID of the user. Upon receiving the notification, the charging management server 50 updates a cumulative billing amount and a remaining amount of a division to which the user belongs in the user management table.

Figure 17:
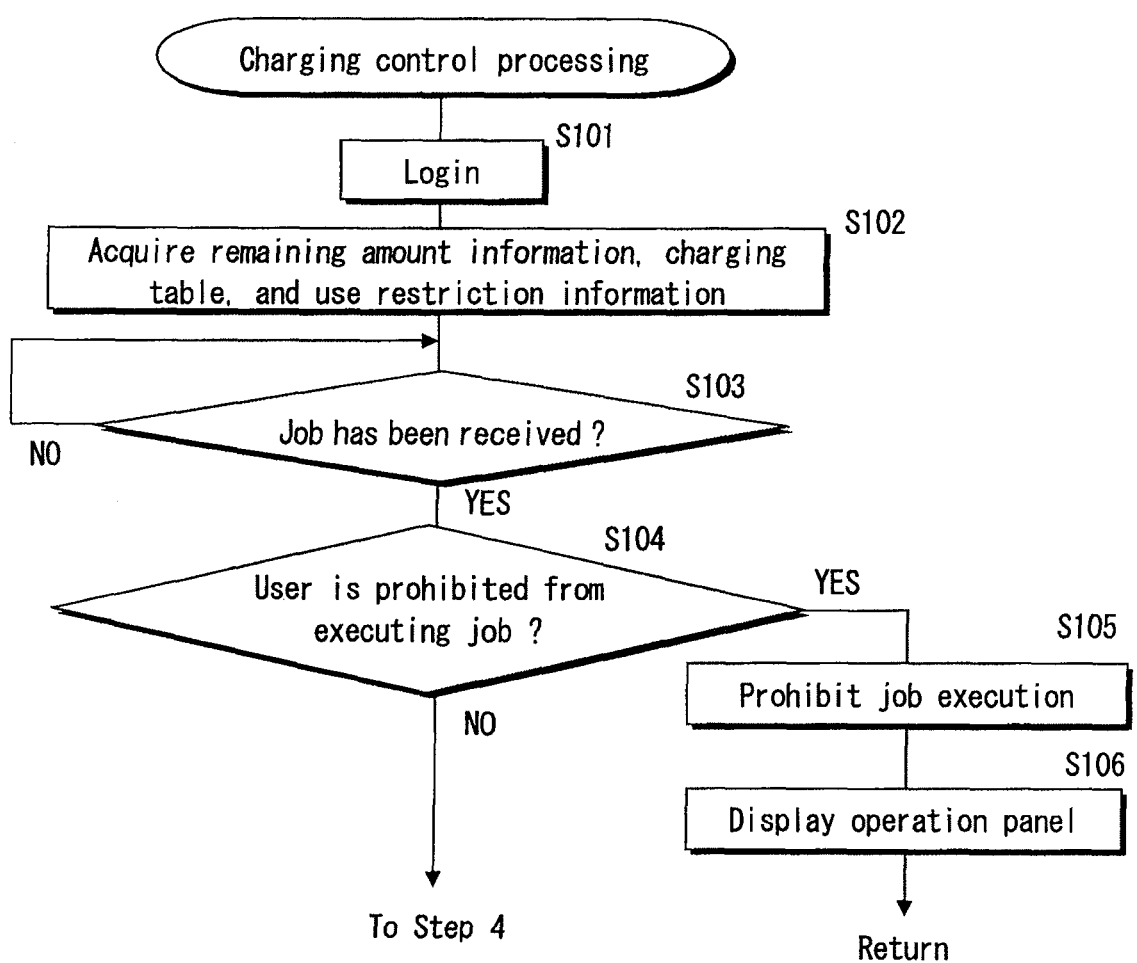
FIG. 17 is a part of a flow chart showing charging control processing performed by the MFP relating to the second embodiment.

On the other hand, in FIG. 17, if judging that the user is prohibited from executing the job (Step S104: YES), the MFP 10 prohibits the user from executing the job (Step S105), and displays the prohibition on the display unit of the operation panel 140 (Step S106), and ends the charging control processing, and then returns to the main flow chart.

In the present embodiment, it is possible to perform charging control in the charging management server 50 that is provided separately from the MFP 10. This enables placement of the charging management server 50 near the manager of the MFP 10, thereby facilitating the check of state of charging management.

Also, in the present embodiment, the number of MFPs 10 included in the image processing system is only one. In the case where a plurality of MFPs 10 are connected to the same network, it is unnecessary to store the charging table, the management table, and the like in each of the MFPs 10. Accordingly, it is possible to reduce the capacity of a necessary memory of a control unit included in each of the MFPs 10, thereby realizing the cost reduction. Furthermore, a plurality of MFPs can be collectively managed by the charging management server 50. This enables more efficient charging management.

Although the present invention has been described based on the above embodiments, the present invention is not of course limited to the above embodiments. The following modification examples may be implemented, for example.

(1) Each of the image processing systems relating to the above embodiments is just an example for implementing the present invention. The numbers of client terminals, MFPs, service providing servers, and the like are not limited to those shown in FIG. 1 and FIG. 14.

Also, in the above embodiments, a plurality of services can be executed with use of a single service providing server. Alternatively, a server dedicated to each of the services may be provided. In this case, in the EEPROM 115 (FIG. 2) included in the control unit 110 of the MFP 10, a table is created in which a cooperative job is associated with an IP address of a service providing server that is to execute the cooperative job cooperatively with the MFP 10. Upon receiving selection of a cooperative job, the MFP 10 refers to this table, and requests a service providing server whose IP address is associated with the selected cooperative job to provide with a service of executing the cooperative job.

(2) According to the structure of the modification (1) in which a dedicated server is provided for each service, cooperative jobs are in one-to-one correspondence with IP addresses of service providing servers. Accordingly, it is unnecessary to provide the cooperative job setup screen as shown in FIG. 9 to FIG. 13. Instead, simply by providing a reception screen for IP address of a server that is to execute a cooperative job cooperatively with the MFP 10 for example, it is also possible to perform control such that a type of the cooperative job is identified based on the IP address received via the reception screen to execute the cooperative job.

In other words, in the structure of the modification example (1), it may be employed to provide a table in which addresses on the network such as IP addresses and mail addresses respectively correspond to cooperative jobs and a reception unit for receiving the addresses on the network. According to this structure, control is performed such that a cooperative job that is an execution target is identified based on an address received by the reception unit, and the identified cooperative job is executed.

Furthermore, in the structure of the modification example (1), it may be employed to separately provide a reception screen for receiving an address on the network of a transmission destination. According to this structure, upon receiving input of the address of the transmission destination via the reception screen, the MFP 10 judges that a scanning distribution job for the transmission destination has been received.

(3) The second embodiment employs the structure to provide each of the charging tables for each user or each group to which the user belongs. This structure may be also employed in the first embodiment.

On the contrary, each of charging tables common among users may be employed in the second embodiment without providing a charging table for each user.

(4) In the charging control performed in Steps S9 to S13 of FIG. 8, while a job is executed, a remaining amount is appropriately calculated for each unit job (for example, for each processing on one sheet). Control is performed such that when execution of a subsequent unit job results in shortage of the remaining amount, execution of the job is prohibited. Alternatively, the following control may be performed. For example, information relating to the volume of a job is acquired before execution of the job (in the case of a copy job for example, this information is acquired by scanning images of all documents beforehand and counting the number of pieces of the documents). Then, a billing amount that will be charged at completion of the job is estimated. If the estimated billing amount results in shortage of a remaining amount, start of execution of the job is prohibited.

Further alternatively, without forcibly prohibiting execution of a job, charging processing may be performed by displaying a billing amount and a remaining amount on the display unit of the operation panel 140 simply by calculating a cumulative billing amount.

(5) Also, in the above embodiments, charging management is performed by allocating a budget amount for each division. Alternatively, charging management may be performed by allocating a budget amount not for each group such as division but for each user. On the contrary, in a greatly small company or a personal firm, there is no special necessity to perform charging management in units of groups. Accordingly, charging management may be performed simply with use of only a single budget amount. In this case, there is also no necessity to identify a user, and accordingly, logging does not necessarily need to be performed.

(6) In the above embodiments, a user inputs, in the MFP 10, a user ID and a password that are identification information of the user for logging in the MFP 10. Alternatively, in an office where an outsider is unlikely to use the MFP 10, there is a case where use of password is not specifically necessary.

(7) In the above embodiments, the description has been provided with respect to the case where a job is received via the operation panel 140 of the MFP 10. Alternatively, the client terminal 30 also may issue a job to the MFP 10 via the LAN 40. In this case, a setup screen similar to that displayed on the display unit of the MFP 10 is displayed on a monitor of the client terminal 30.

(8) The program relating to the charging control processing relating to the above embodiments can be recorded in various types of computer readable recording media. Such computer readable recording media include a magnetic disk such as a magnetic tape and a flexible disk, an optical recording medium such as a DVD, a CD-ROM, a CD-R, an MO, and a PD, and a flash memory recording medium such as a Smart Media™ and a COMPACTFLASH™. The program recorded in such a recording medium is produced, assigned, and so on. Alternatively, the program is transmitted and supplied via various types of networks including the Internet such as wire and wireless networks, broadcasting, electrical communication line, satellite communications, and the like.

Also, a program for realizing the present invention does not need to include all modules for causing a computer to perform the above-described processing. For example, it may be possible to cause the computer to perform each processing of the present invention with use of various types of general programs that are separately installable in an information processing apparatus, such as a communication program and a program included in an Operating System (OS).

(9) In the above embodiments, the description has been provided with respect to an MFP that is a complex machine as an example of an image processing apparatus. According to circumstances, it may be possible to employ any image processing apparatus such as a copy machine, a printer, a FAX machine, and a scanner, as long as the image processing apparatus is capable of executing a job cooperatively with an external service providing server.

The above embodiments and modification examples each solve the problem described in the above [Technical Problem]. With the structures of the above examples, even in a case where a cooperative job is executed, it is possible to appropriately perform charging in the same way as a case where a normal job is executed only by an image processing apparatus.

Here, the piece of second charging information may show whether charging for use of the image processing apparatus is required for charging for the execution of the cooperative job and an amount charged for use of the service providing apparatus, and if the charging for use of the image processing apparatus is required, the second charging part may perform the charging for the execution of the cooperative job by further referring to the piece of first charging information.

As described above, the piece of second charging information shows whether charging for use of the image processing apparatus is required. If charging for use of the image processing apparatus is required, the piece of first charging information is referred to. In this case, the volume of the piece of second charging information is reduced by the volume of the piece of first charging information referred to. This can reduce the memory capacity necessary for storing the piece of second charging information, and the cost reduction is realized.

Also, the piece of second charging information may define an amount charged for use of the service providing apparatus as a predetermined ratio of an amount charged for use of the image processing apparatus, and the second charging part may perform the charging for the execution of the cooperative job by further referring to the piece of first charging information.

The second charging part charges for execution of the second job by further referring to the piece of first charging information. In this case, again, the volume of the piece of second charging information is reduced by the volume of the piece of first charging information referred to, and as a result the cost reduction is realized.

Also, the piece of second charging information may define an amount charged for use of the service providing apparatus as a predetermined amount irrespective of the piece of first charging information.

The piece of second charging information simply defines a uniform billing amount to be charged. This reduces the volume of the piece of second charging information, and as a result the cost reduction is realized.

Here, the image processing apparatus may further comprise an identification information receiver operable to receive a piece of identification information identifying a user that is either one of a person and a group, wherein the charging information storage may store therein pieces of first charging information and pieces of second charging information that are in one-to-one correspondence with users, respectively, and with respect to the user identified by the received piece of identification information, the first charging part may perform charging by referring to one of the pieces of first charging information corresponding to the user, and the second charging part may perform charging by referring to one of the pieces of second charging information corresponding to the user.

With such a structure, it is possible to perform detailed charging processing for each user or each group to which the user belongs.

Also, a charging management system relating to another one aspect of the present invention is a charging management system that includes an image processing apparatus and a charging management server that are connected with each other via a network, the charging management server managing an amount charged for a job executed by the image processing apparatus, wherein the image processing apparatus comprises; a job receiver operable to receive a job; a judgment part operable to judge whether the received job is an apparatus job or a cooperative job, the apparatus job being to be executed only by the image processing apparatus, the cooperative job being to be executed by the image processing apparatus cooperatively with the service providing apparatus; an acquisition part operable to acquire, from the charging management server, a piece of first charging information showing a charging condition for use of the image processing apparatus and a piece of second charging information showing a charging condition for execution of the cooperative job; a job execution part operable to, based on the judgment performed by the judgment part, execute the apparatus job or part of the cooperative job; a first charging part operable to charge for execution of the apparatus job by referring to the piece of first charging information; a second charging part operable to charge for execution of the cooperative job by referring to the piece of second charging information; and a notification part operable to notify the charging management server of a result of the charging performed by at least one of the first charging part and the second charging part, and the charging management server comprises: a storage operable to store the piece of first charging information and the piece of second charging information; a transmitter operable to, upon being accessed by the image processing apparatus, transmit the piece of first charging information and the piece of second charging information to the image processing apparatus; and an update part operable to receive the result of the charging transmitted from the image processing apparatus, and update at least one of the piece of first charging information and the piece of second charging information stored in the storage that corresponds to the received result of the charging.

Such a system structure also can achieve the same effect as described above. Furthermore, it is possible to collectively manage the charging status of a plurality of image processing apparatuses using a single charging management server. This is greatly useful.

Also, a charging management system relating to another one aspect of the present invention, an image processing apparatus that is included in a charging management system that manages an amount charged for a job executed by the image processing apparatus, the charging management system further including a charging management server connected with the image processing apparatus via a network, wherein the image processing apparatus comprises: a job receiver operable to receive a job; a judgment part operable to judge whether the received job is an apparatus job or a cooperative job, the apparatus job being to be executed only by the image processing apparatus, the cooperative job being to be executed by the image processing apparatus cooperatively with the service providing apparatus; an acquisition part operable to acquire, from the charging management server, a piece of first charging information showing a charging condition for use of the image processing apparatus and a piece of second charging information showing a charging condition for execution of the cooperative job; a job execution part operable to, based on the judgment performed by the judgment part, execute the apparatus job or part of the cooperative job; a first charging part operable to charge for execution of the apparatus job by referring to the piece of first charging information; a second charging part operable to charge for execution of the cooperative job by referring to the piece of second charging information; and a notification part operable to notify the charging management server of a result of the charging performed by at least one of the first charging part and the second charging part.

Also, a charging management method relating to another one aspect of the present invention, a charging management method that is to be executed by an image processing apparatus capable of executing a cooperative job that is to be executed cooperatively with a service providing apparatus connected thereto via a network, wherein the image processing apparatus comprises an acquisition part operable to acquire a piece of first charging information showing a charging condition for use of the image processing apparatus and a piece of second charging information showing a charging condition for execution of the cooperative job, and the charging management method comprises: a job receiving step of receiving a job; a judging step of judging whether the received job is an apparatus job or the cooperative job, the apparatus job being to be executed only by the image processing apparatus; a job executing step of, based on the judgment performed in the judging step, executing the apparatus job or part of the cooperative job; a charging step of, (i) if the received job is judged to the apparatus job, performing first charging for execution of the apparatus job by referring to the piece of first charging information, and (ii) if the received job is judged to the cooperative job, performing second charging for execution of the cooperative job by referring to the piece of second charging information.

Also, a recording medium relating to another one aspect of the present invention may be a recording medium having recorded therein a charging management program to be executed by a computer of the image processing apparatus.

When a charging management method and charging management program recorded in a recording medium as described above are executed by an image processing apparatus, it is possible to exhibit the same effect as achieved by the invention of the above image processing apparatus.

The present invention is preferable for performing charging management in an image processing apparatus that is capable of executing a job cooperatively with an external service providing server.

EXPLANATION OF REFERENCE

10: MFP
20: service providing server
30: client terminal
40: LAN
50: charging management server
101: apparatus use charging table
102: cooperative job charging table
103: user management table
104: use restriction information table
110: control unit
120: scanner unit
130: printer unit
140: operation panel
116 and 531: charging table storage unit
117 and 532: management table storage unit
533: use restriction information storage unit

The invention claimed is:

1. An image processing apparatus that is capable of executing a cooperative job that is to be executed cooperatively with a service providing apparatus connected thereto via a network, the image processing apparatus comprising:

a job receiver operable to receive a job;

a judgment part operable to judge whether the received job is an apparatus job or the cooperative job, the apparatus job being to be executed only by the image processing apparatus;

a charging information storage operable to store therein a first component storing a piece of first charging information showing a charging condition for use of the image processing apparatus and a second component storing a piece of second charging information showing a charging condition for execution of the cooperative job, the first component storing only information regarding charging conditions on individual apparatus jobs, the second component storing only information regarding charging conditions on individual cooperative jobs, and the piece of second charging information comprising information specifying whether charging for use of the image processing apparatus is required for charging for the execution of the cooperative job;

a job execution part operable to, based on the judgment performed by the judgment part, execute the apparatus job or part of the cooperative job;

a first charging part operable to charge for execution of the apparatus job by referring to the piece of first charging information; and a second charging part operable to charge for execution of the cooperative job by referring to the piece of second charging information.

2. The image processing apparatus of claim 1, wherein the piece of second charging information comprises an amount charged for use of the service providing apparatus, and if the charging for use of the image processing apparatus is required, the second charging part performs the charging for the execution of the cooperative job by further referring to the piece of first charging information.

3. The image processing apparatus of claim 1, wherein the piece of second charging information defines an amount charged for use of the service providing apparatus as a predetermined ratio of an amount charged for use of the image processing apparatus, and the second charging part performs the charging for the execution of the cooperative job by further referring to the piece of first charging information.

4. The image processing apparatus of claim 1, wherein the piece of second charging information defines an amount charged for use of the service providing apparatus as a predetermined amount irrespective of the piece of first charging information.

5. The image processing apparatus of claim 1, further comprising an identification information receiver operable to receive a piece of identification information identifying a user that is either one of a person and a group, wherein the charging information storage stores therein pieces of first charging information and pieces of second charging information that are in one-to-one correspondence with users, respectively, and with respect to the user identified by the received piece of identification information, the first charging part performs charging by referring to one of the pieces of first charging information corresponding to the user, and the second charging part performs charging by referring to one of the pieces of second charging information corresponding to the user.

6. A charging management system that includes an image processing apparatus and a charging management server that are connected with each other via a network, the charging management server managing an amount charged for a job executed by the image processing apparatus, wherein the image processing apparatus comprises:

a job receiver operable to receive a job;

a judgment part operable to judge whether the received job is an apparatus job or a cooperative job, the apparatus job being to be executed only by the image processing apparatus, the cooperative job being to be executed by the image processing apparatus cooperatively with the service providing apparatus;

an acquisition part operable to acquire, from the charging management server, a piece of first charging information showing a charging condition for use of the image processing apparatus and a piece of second charging information showing a charging condition for execution of the cooperative job;

a job execution part operable to, based on the judgment performed by the judgment part, execute the apparatus job or part of the cooperative job;

a first charging part operable to charge for execution of the apparatus job by referring to the piece of first charging information;

a second charging part operable to charge for execution of the cooperative job by referring to the piece of second charging information; and a notification part operable to notify the charging management server of a result of the charging performed by at least one of the first charging part and the second charging part, and the charging management server comprises:

a storage operable to store a first component storing the piece of first charging information and a second component storing the piece of second charging information, the first component storing only information regarding charging conditions on individual apparatus jobs, the second component storing only information regarding charging conditions on individual cooperative jobs, and the piece of second charging information comprising information specifying whether charging for use of the image processing apparatus is required for charging for the execution of the cooperative job;

a transmitter operable to, upon being accessed by the image processing apparatus, transmit the piece of first charging information and the piece of second charging information to the image processing apparatus; and an update part operable to receive the result of the charging transmitted from the image processing apparatus, and update at least one of the piece of first charging information and the piece of second charging information stored in the storage that corresponds to the received result of the charging.

7. An image processing apparatus that is included in a charging management system that manages an amount charged for a job executed by the image processing apparatus, the charging management system further including a charging management server connected with the image processing apparatus via a network, wherein the image processing apparatus comprises:

a job receiver operable to receive a job;

a judgment part operable to judge whether the received job is an apparatus job or a cooperative job, the apparatus job being to be executed only by the image processing apparatus, the cooperative job being to be executed by the image processing apparatus cooperatively with the service providing apparatus;

an acquisition part operable to acquire, from the charging management server, a piece of first charging information showing a charging condition for use of the image processing apparatus and a piece of second charging information showing a charging condition for execution of the cooperative job;

a job execution part operable to, based on the judgment performed by the judgment part, execute the apparatus job or part of the cooperative job;

a first charging part operable to charge for execution of the apparatus job by referring to the piece of first charging information;

a second charging part operable to charge for execution of the cooperative job by referring to the piece of second charging information; and a notification part operable to notify the charging management server of a result of the charging performed by at least one of the first charging part and the second charging part, wherein the charging management server comprises a storage operable to store a first component storing the piece of first charging information and a second component storing the piece of second charging information, the first component storing only information regarding charging conditions on individual apparatus jobs, the second component storing only information regarding charging conditions on individual cooperative jobs, and the piece of second charging information comprising information specifying whether charging for use of the image processing apparatus is required for charging for the execution of the cooperative job.

8. A charging management method that is to be executed by an image processing apparatus capable of executing a cooperative job that is to be executed cooperatively with a service providing apparatus connected thereto via a network, wherein the image processing apparatus comprises, an acquisition part operable to acquire a piece of first charging information showing a charging condition for use of the image processing apparatus and a piece of second charging information showing a charging condition for execution of the cooperative job, the charging management method comprises:

a job receiving step of receiving a job;

a judging step of judging whether the received job is an apparatus job or the cooperative job, the apparatus job being to be executed only by the image processing apparatus;

a job executing step of, based on the judgment performed in the judging step, executing the apparatus job or part of the cooperative job;

a charging step of, (i) if the received job is judged to the apparatus job, performing first charging for execution of the apparatus job by referring to the piece of first charging information, and (ii) if the received job is judged to the cooperative job, performing second charging for execution of the cooperative job by referring to the piece of second charging information; and storing a first component storing the piece of first charging information and a second component storing the piece of second charging information, the first component storing only information regarding charging conditions on individual apparatus jobs, the second component storing only information regarding charging conditions on individual cooperative jobs, and the piece of second charging information comprising information specifying whether charging for use of the image processing apparatus is required for charging for the execution of the cooperative job.

9. A non-transitory recording medium having recorded therein a charging management program that is to be executed by an image processing apparatus capable of executing a cooperative job that is to be executed cooperatively with a service providing apparatus connected thereto via a network, wherein the image processing apparatus comprises an acquisition part operable to acquire a piece of first charging information showing a charging condition for use of the image processing apparatus and a piece of second charging information showing a charging condition for execution of the cooperative job, the charging management program causes a computer of the image processing apparatus to execute:

job reception processing of receiving a job;

judgment processing of judging whether the received job is an apparatus job or the cooperative job, the apparatus job being to be executed only by the image processing apparatus;

job execution processing of, based on the judgment performed in the judgment processing, executing the apparatus job or part of the cooperative job;

charging processing of, (i) if the received job is judged to the apparatus job, performing first charging for execution of the apparatus job by referring to the piece of first charging information, and (ii) if the received job is judged to the cooperative job, performing second charging for execution of the cooperative job by referring to the piece of second charging information, and storing a first component storing the piece of first charging information and a second component storing the piece of second charging information, the first component storing only information regarding charging conditions on individual apparatus jobs, the second component storing only information regarding charging conditions on individual cooperative jobs, and the piece of second charging information comprising information specifying whether charging for use of the image processing apparatus is required for charging for the execution of the cooperative job.

* * * * *